United States Patent Office 3,494,683
Patented Feb. 10, 1970

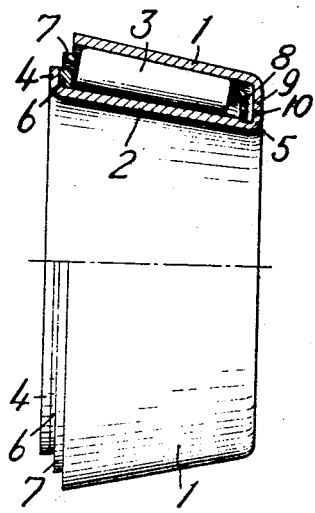
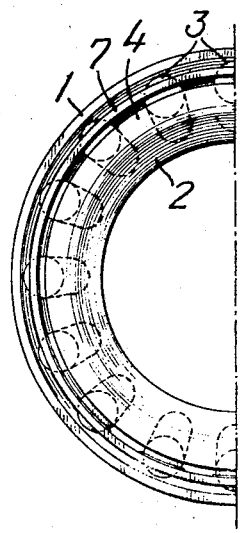
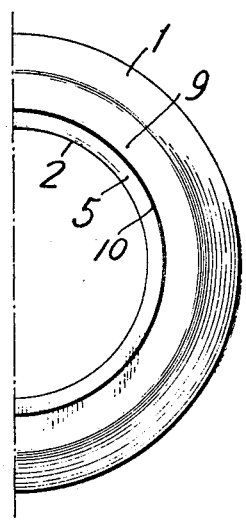
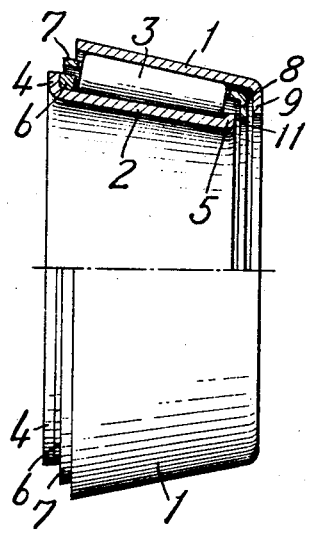
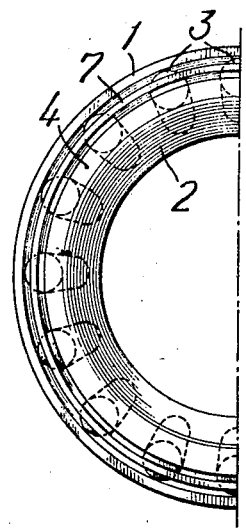
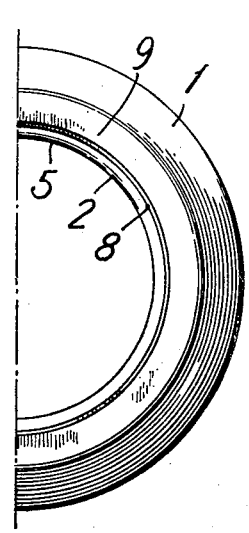

3,494,683
SHELL TYPE TAPERED BEARING
Hiroshi Teramachi, 23-3, 2-chome, Nakamachi,
Meguro-ku, Tokyo, Japan
Filed Sept. 11, 1968, Ser. No. 759,147
Claims priority, application Japan, May 4, 1968,
43/59,691; June 17, 1968, 43/50,992
Int. Cl. F16c 33/00
U.S. Cl. 308—214                    2 Claims

ABSTRACT OF THE DISCLOSURE

This specification discloses a novel, shell type tapered bearing assembly of simple construction which can be assembled and disassembled with greater ease and readiness and is much more economical to manufacture. The shell type tapered bearing assembly comprises an annular inner shell and an annular outer shell both shaped in tapered form. A plurality of equally spaced, tapered rollers interposed between the two annular shells. Each of the tapered rollers is held by a retainer. The taper of the inner and outer shells corresponds to that of said tapered rollers, thus ensuring the ready assembling of the shells and the rollers. A thrust ring is fitted in the inner corner of one of flange portions provided in the ends of the inner shell. This thrust ring may be omitted when the inner shell has one of its ends formed with a U-shaped thrust receiving portion. The outer shell has one of its ends inwardly bent to form an inwardly turned flange portion, of which the inner end surface is disposed in abutment with the end surface of the corresponding flange portion of the inner shell to thereby provide sealing effect between the abutting end surfaces of the two shells.

BACKGROUND OF THE INVENTION

This invention relates to a bearing assembly, and more particularly to a novel type bearing assembly referred to herein as a shell type tapered bearing.

In most of the bearing assemblies according to the prior art there was required a strict tolerance between the parts of the assembly and accordingly the assembling and disassembling of the parts required much trouble or difficulty. In addition to these disadvantages, such conventional bearing assemblies were expensive to manufacture because of their delicate structure.

SUMMARY OF THE INVENTION

It is therefore a primary object of the present invention to provide a novel, shell type tapered bearing assembly of much simplified construction which can be assembled and disassembled with greater ease and readiness and which is much more economical to manufacture.

It is another object of the present invention to provide a bearing assembly of the above described type which eliminates the necessity of using thrust rings therein.

According to an aspect of the present invention, there is provided a shell type tapered bearing assembly which comprises an annular inner shell and an annular outer shell both shaped in tapered form, a plurality of equally spaced, tapered rollers interposed between said inner and outer shells, each of said tapered rollers being held by a retainer, said inner and outer shells having a taper corresponding to that of said tapered rollers, said inner shell having its two ends outwardly bent to form outwardly turned flange portions, and a thrust ring fitted in the inner corner portion of that one of said flange portions which is adjacent the larger diametered end portion of the inner shell, said outer shell having its smaller diametered end portion inwardly bent to form an inwardly turned flange portion, the inner end surface of said inwardly turned flange portion of said outer shell being disposed in abutment relationship with the outer end surface of said outwardly turned flange portion formed in the smaller diametered end portion of said inner shell to thereby provide sealing effect between said abutting peripheral end surfaces of said two shells.

According to another aspect of the present invention, there is provided a shell type tapered bearing assembly which comprises an annular inner shell and an annular outer shell both formed of thin steel sheet and shaped in tapered form, and a plurality of equally spaced, tapered rollers interposed between said inner and outer shells, each of said tapered rollers being held at the smaller diametered end thereof by a retainer having an inwardly turned flange portion formed therein for reinforcement of the retainer, said inner and outer shells having a taper corresponding to that of said tapered rollers, said inner shell having its larger diametered end portion outwardly and then inwardly turned to form a U-shaped thrust receiving portion, said inner shell having its smaller diametered end portion outwardly turned to form a small flange portion, said outer shell having its smaller diametered end portion inwardly turned to form an inwardly turned flange portion.

DETAILED EXPLANATION OF THE INVENTION

The invention will now be described more fully with respect to various embodiments thereof as shown in the accompanying drawings, in which:

FIGURE 1 is a side view, partly in cross section, of a shell type tapered bearing assembly according to an embodiment of the present invention;

FIGURE 2 is a fragmentary end view illustrating the left end of FIGURE 1;

FIGURE 3 is a similar view showing the right end of FIGURE 1;

FIGURE 4 is a side view, partly in cross-section, of a slightly modified form of shell type tapered bearing assembly according to the present invention;

FIGURE 5 is a fragmentary end view showing the left end of FIGURE 4;

FIGURE 6 is a similar view showing the right end of FIGURE 4;

Figure 7:
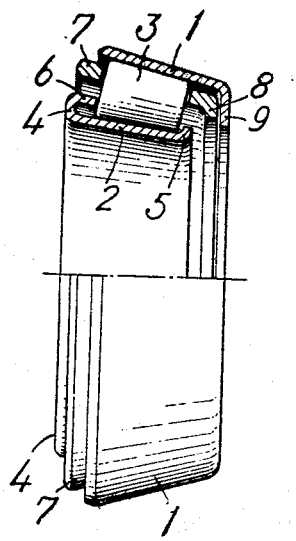
FIGURE 7 is a side view, partly in cross-section, of another form of shell type tapered bearing assembly according to the present invention.

Referring now to FIGURES 1 to 3, there is shown a shell type tapered bearing assembly according to the present invention, which comprises an annular outer shell 1 and an annular inner shell 2 which are formed with different degrees of taper. These different degrees of taper with which the outer and inner annular shells 1 and 2 are formed correspond to the degree of taper of tapered rollers 3 interposed in equally spaced relationship between the two annular shells 1 and 2. Said annular inner shell 2 has the opposite ends thereof outwardly bent to form flange portions 4 and 5 as best shown in FIGURE 1. The flange portion 4 formed in the larger diametered end portion of said inner annular shell 2 has a greater width than the other flange portion 5 formed in the smaller diametered end portion of the inner shell 2, and the latter flange portion 5 is so formed as to slightly project outwardly of the inner shell 2. A thrust ring 6 is fitted in the inner corner portion of the flange portion 4, and the tapered rollers 3 have their respective larger diametered end surfaces disposed in opposed relationship with said thrust ring 6. A retainer 7 is provided to hold each of the tapered rollers 3, said retainer 7 being inwardly bent in the end portion thereof adjacent the smaller diametered end of said tapered roller to thereby form a flange portion 8 therein. The annular outer shell 1 has the smaller diametered end portion thereof inwardly bent to form a flange portion 9, the inner end surface of which is disposed in abutment with the outer end surface of the flange portion 5 formed in the inner shell 2 adjacent the smaller diametered end thereof, in such a manner that there is provided sealing effect therebetween.

Referring to FIGURES 4 to 6 showing another form of shell type tapered bearing assembly provided according to the present invention, this alternative embodiment is similar in the construction of outer and inner annular shells, tapered rollers and retainer to the embodiment described just above and shown in FIGURES 1 to 3. However, a slight modification is seen in this assembly, in which the flange portion 5 adjacent the smaller diametered end of the inner annular shell 2 is positioned inwardly of the flange portion 8 formed at one end of the retainer 7 and said flange portion 5 is also opposed to the smaller diametered end surface of the tapered roller 3 so as to provide a seal 11 between the inner edge of the flange portion 8 of the retainer 7 and the outer edge of the flange portion 5 of the inner shell 2.

With these described embodiments of the present invention, in which the degree of taper of the outer and inner annular shells is selected so as to correspond to that of the tapered rollers interposed therebetween, the assembling of these parts can be accomplished with much ease and simplicity and moreover, the taper of the two shells readily ensures the assembling and disassembling of the bearing. Furthermore, the use of shell type outer and inner annular members makes the resultant assembly less in weight as well as easier to handle and more economical to manufacture than the prior art bearings.

Figure 8:
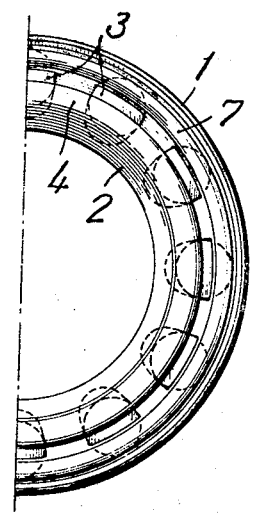
FIGURE 8 is a fragmentary end view illustrating the left end of FIGURE 7.
Figure 9:
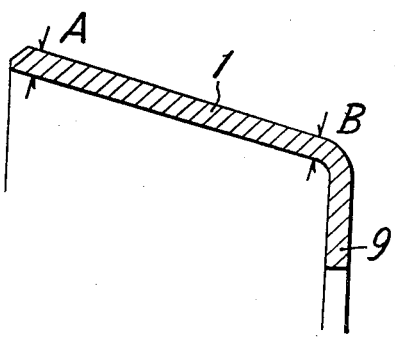
FIGURE 9 is an enlarged, fragmentary sectional view of the outer shell.

In FIGURES 7 to 9 which illustrate still another embodiment of the present invention, provision is made of an annular outer shell 1 and an annular inner shell 2, which are both formed of thin steel sheet with different degrees of taper. The degree of taper is different not only between the outer and inner shells but also between the inner and outer side walls of the outer shell and between the inner and outer side walls of the inner shell, and thus there are provided four different degrees of taper, which are determined such that the degree of taper of the inner side wall of the outer shell 1 and that of the outer side wall of the inner shell 2 correspond to the degree of taper provided by tapered rollers 3 interposed therebetween and that under the assembled condition the axial extensions (not shown) of said two tapered walls intersect each other on the center line of the tapered bearing assembly. The degree of taper of the outer side wall of the outer shell 1 and that of the inner side wall of the inner shell 2 may respectively slightly differ from the degrees of taper of said inner and outer side walls of the outer and inner shells, taking into account the fact that the degree of taper of the inner side wall of the inner shell tends to produce variation of the wall thickness between the larger and smaller diametered ends of the shell during the process of manufacture, and such difference in degree of taper results in no inconvenience in use but leads to a greater ease to manufacture. Thus, the wall thickness of the outer shell 1 in the larger diametered portion A may conveniently be somewhat greater than that in the smaller diameter portion B of the same shell. The tapered inner annular shell 2 has the larger diametered end 4 thereof outwardly and then inwardly bent to form a U-shaped thrust receiving portion, while it has the smaller end thereof outwardly bent to form a slightly projected flange portion 6 which serves to restrain the rollers 3 and retainer 7 from moving outwardly (or rightwardly as viewed in FIGURE 7) beyond the confinement of the inner annular shell 2. The retainer 7 holding each tapered roller 3 has the end thereof adjacent the smaller diametered end of the roller inwardly bent to provide a flange portion 8 intended to reinforce the retainer itself. The outer annular shell 1 has the smaller diametered end portion thereof inwardly bent to form a flange portion 9 which serves to reinforce the outer shell 1 itself.

With the arrangement of the bearing discussed just above, the assembly is accomplished by disposing the tapered rollers 3 in the retainer 7 from the inner side wall of the retainer and mounting the inner annular shell 2 inwardly of the rollers 3. The retainer is of course provided with a plurality of roller holding openings in the side wall thereof to hold the tapered rollers 3. Each of the roller holding openings is so dimensioned as to prevent the tapered roller 3 from escaping outwardly therethrough so that when the inner shell is assembled to the tapered rollers and retainer the rollers 3 are restrained from escaping outwardly through their respective holding openings. The fact that the inner diameter of the flange portion 8 adjacent the smaller end of the retainer 7 is made somewhat greater than the outer diameter of the flange portion adjacent the smaller diametered end portion of the inner annular shell 2 facilitates the mounting of the inner shell 2. After the inner shell 2 has been mounted, the flange portion 8 of the retainer is caulked inwardly to thereby check the loose outward movement of the tapered rollers through the roller holding openings so that the tapered rollers 3 do not escape beyond the flange portion 6 of the inner annular shell 2. Subsequently the outer annular shell 1 is mounted thereon, whereby a complete bearing assembly is obtained.

In the bearing provided according to this last embodiment, as disclosed above, the taper of the outer and inner shells corresponds to that of the tapered rollers interposed therebetween and the degrees of slops of the two shells are selected taking into account the difference in wall thickness which may arise between the larger and smaller diametered portions of the shell walls when they are drawn from a thin steel sheet, and this makes the bearing assembly less difficult and simpler to manufacture as well as ensures such a high precision of mounting that the angle of the bearing box can be in agreement with that of the outer wall of the bearing. Additionally, it is only required to make the angle of the shaft with that of the inner wall of the bearing and thus the requirement of strict tolerance existing in the conventional bearings is eliminated. Still additionally, the provision of tapers in the outer and inner shells ensures the ready assembling and disassembling of the bearing assembly and the U-shaped bent portion at the larger diametered end of the inner shell serves to receive any thrust produced by the rollers without the necessity of using any thrust ring fitted in the bearing assembly. This leads to the economy of material and labor used in the manufacture. Also, the use of shell type outer and inner annular numbers results in the light weight of the assembly and ease for handling, and the simplified construction enables low cost manufacture.

Although the present invention has been shown and described by way of example, it should be understood that the true scope of the invention is only limited by the appended claims.

What is claimed is:

1. A shell type tapered bearing comprising an annular inner shell and an annular outer shell both shaped in tapered form, a plurality of equally spaced, tapered rollers interposed between said inner and outer shells, each of said tapered rollers being held by a retainer, said inner and outer shells having a taper corresponding to that of said tapered rollers, said inner shell having its two ends outwardly bent to form outwardly turned flange portions, and a thrust ring fitted in the inner corner portion of that one of said flange portions which is adjacent the larger diametered end portion of the inner shell, said outer shell having its smaller diametered end portion inwardly bent to form an inwardly turned flange portion, the inner end surface of said inwardly turned flange portion of said outer shell being disposed in abutment relationship with the outer end surface of said outwardly turned flange portion formed in the smaller diametered end portion of said inner shell to thereby provide sealing effect between said abutting peripheral end surfaces of said two shells.

2. A shell type tapered bearing comprising an annular inner shell and an annular outer shell both formed of thin steel sheet and shaped in tapered form, and a plurality of equally spaced, tapered rollers interposed between said inner and outer shells, each of said tapered rollers being held at the smaller diametered end thereof by a retainer having an inwardly turned flange portion formed therein for reinforcement of the retainer, said inner and outer shells having a taper corresponding to that of said tapered rollers said inner shell having its larger diametered end portion outwardly and then inwardly turned to form a U-shaped thrust receiving portion, said inner shell having its smaller diametered end portion outwardly turned to form a small flange portion, said outer shell having its smaller diametered end portion inwardly turned to form an inwardly turned flange portion.

References Cited

FOREIGN PATENTS 1,340,008   9/1963   France.

EDGAR W. GEOGHEGAN, Primary Examiner

F. SUSKO, Assistant Examiner